(12) United States Patent
Mizuno et al.

(10) Patent No.: US 6,700,110 B2
(45) Date of Patent: Mar. 2, 2004

(54) OPTICAL DETECTOR DEVICE

(75) Inventors: Seiichiro Mizuno, Hamamatsu (JP);
Naohisa Mukozaka, Hamamatsu (JP);
Haruyoshi Toyoda, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 96 days.

(21) Appl. No.: 10/147,307

(22) Filed: May 17, 2002

(65) Prior Publication Data

US 2002/0190193 A1 Dec. 19, 2002

Related U.S. Application Data

(63) Continuation-in-part of application No. PCT/JP00/08175, filed on Nov. 20, 2000.

(30) Foreign Application Priority Data

Nov. 18, 1999 (JP) ..................................... P1999-328227

(51) Int. Cl.[7] .............................................. H01L 27/00
(52) U.S. Cl. ............................. 250/208.1; 250/214 R; 348/307; 327/514
(58) Field of Search ......................... 250/208.1, 214 R, 250/214.1; 348/307–310

(56) References Cited

U.S. PATENT DOCUMENTS

| | | | |
|---|---|---|---|
| 5,376,992 A | 12/1994 | Hasegawa et al. | 354/426 |
| 6,002,435 A | 12/1999 | Yamamoto et al. | 348/307 |
| 6,542,190 B1 * | 4/2003 | Chin | 348/308 |
| 6,593,562 B1 * | 7/2003 | Parrish et al. | 250/208.1 |
| 6,606,123 B2 * | 8/2003 | Mizuno | 348/308 |

FOREIGN PATENT DOCUMENTS

| | | |
|---|---|---|
| EP | 0 679 869 A2 | 11/1995 |
| JP | 2000-32342 | 1/2000 |

OTHER PUBLICATIONS

Hiroaki Ishiwata et al., "CMOS Active Pixel Sensor with 3D–Gesture Recognition System", ITE Technical, rt. vol. 23, No. 30, Mar. 1999, pp. 13–16.

* cited by examiner

Primary Examiner—David Porta
Assistant Examiner—Patrick J. Lee
(74) Attorney, Agent, or Firm—Morgan, Lewis & Bockius LLP (57) ABSTRACT

Each of N optical detector parts $80_1$ to $80_N$ has a photodiode PD, a capacitor $C_d$ and a switch $SW_0$. An amplifier $A_1$, an integrator circuit capacitor $C_{f1}$, and a switch $SW_{11}$, are connected in parallel between the input terminal and the output terminal of an integrator circuit 10. The capacitance of the integrator circuit capacitance $C_{11}$ is equal to the capacitance of the capacitor $C_d$ in each of the N optical detector parts $80_1$ to $80_N$. A switch $SW_{01}$, is equipped between the input terminal of the integrator circuit 10 and the switch $SW_0$ for each of the N optical detector parts $80_1$ to $80_N$. A switch $SW_{02}$ is equipped between the output terminal of the integrator circuit 10 and the switch $SW_0$ in each of the N optical detector parts $80_1$, to $80_N$.

12 Claims, 10 Drawing Sheets

Fig.1

*Fig.2A*
OPTICAL DETECTOR PART $80_1$ SW0

*Fig.2B*
OPTICAL DETECTOR PART $80_2$ SW0

*Fig.2C*
OPTICAL DETECTOR PART $80_3$ SW0

*Fig.2D*
OPTICAL DETECTOR PART $80_n$ SW0

*Fig.2E*
OPTICAL DETECTOR PART $80_N$ SW0

Fig.3A OPTICAL DETECTOR PART 80n SW0

Fig.3B SWITCH SW01

Fig.3C SWITCH SW02

Fig.3D INTEGRATOR CIRCUIT 10 SW11

Fig.3E OPTICAL DETECTOR PART 80n PD VOLTAGE

Fig.3F INTEGRATOR OUTPUT

Fig.3G OPTICAL DETECTOR PART 80n PD VOLTAGE

Fig.3H INTEGRATOR OUTPUT

FIRST FRAME

Fig.10B

SECOND FRAME

OPTICAL DETECTOR DEVICE

RELATED APPLICATION

This is a continuation-in-part application of application Ser. No. PCT/JP00/08175 filed on Nov. 20, 2000, now pending.

BACKGROUND OF THE INVENTION

1. Field of the Invention

The present invention relates to an optical detector device that extracts moving objects in incident optical images.

2. Related Background Art

Optical detector devices fabricated by CMOS technologies can be built for a low cost on a single chip that includes the A/D converter circuits and the peripheral digital circuitry. Because of this, optical detector devices have been developed that, rather than just detecting light, include a variety of processing functions (for example, outline extraction or moving object extraction) on a single chip.

An optical detector device that has a moving object extraction function is described, for example, in Ishiwata, et al., "CMOS Image Sensor for the Recognition of Three-Dimensional Gestures," Image Information Media Association Technical Reports, Vol. 23, No. 30, pgs 13–16 (1999).

The optical detector device described in this reference is equipped with two capacitors and plurality of switches for each pixel, where the image data is stored in the first capacitors when one frame is captured and the image data is stored in the second capacitors when the next frame is captured, following which the differences between the image data stored in the respective first and second capacitors are derived.

By the above, the optical detector device extracts moving objects by performing image processing on the chip. This optical detector device provides separate image memory, whereas, conventionally, the image processing has had to be performed after storing the image data in an image memory provided separately.

SUMMARY OF THE INVENTION

In the optical detector device having a moving object extraction function, described in the aforementioned reference, it has been necessary to provide two capacitors and plurality of switches for each pixel, and also necessary to provide a differential circuit for finding the differences between the image data stored, respectively, in the first and second capacitors. Consequently, the area required on the chip for the circuitry for each pixel in this optical detector device has been large, and, as a result, this optical detector device has had the fatal flaw that it could not achieve a high aperture ratio, which determines the light response characteristics of the sensor, and thus could not provide images with high image quality.

The present invention was created to solve the aforementioned problem area, and is an optical detector device that extracts moving objects in the incident image with the object of reducing the surface area on the chip required for the circuitry for each pixel, thereby providing a high aperture ratio and superior optical response characteristics.

The optical detector device of the present invention comprises (A) an optical detector part that has an optical detector element that generate charges according to the intensity of incident light and a capacitor with a specific capacitance and that accumulates the charge generated by the aforementioned optical detector element, (B) an integrator circuit connected to the aforementioned capacitor, and having an integrated circuit capacitor with the aforementioned specific capacitance disposed between the input and output terminals of an amplifier, (C) a first switch equipped between the input terminal of said integrator circuit and the aforementioned optical detector part, and (D) a second switch equipped between the output terminal of the aforementioned integrator circuit and the aforementioned optical detector part. This will be explained in detail below.

A first optical detector device comprises (1) an optical detector part that is equipped with an optical detector element that generates a charge depending on the intensity of incident light and a capacitor that has a capacitance $C_d$ and that accumulates the charge generated by the optical detector element; (2) an integrator circuit which has an amplifier and an integrator circuit capacitor with a capacitance of $C_{f1}$ (where $C_d = C_{f1}$), disposed in parallel between the input terminal and the output terminal thereof, which accumulates the charge that is inputted into the input terminal in the integrator circuit capacitor, and outputs from its output terminal an integrated output according to the amount of the charge accumulated; (3) a first switch equipped between the optical detector part and the input terminal of the integrator circuit; and (4) a second switch equipped between the integrator circuit output terminal and the optical detector part.

In this first optical detector device, the charge that is generated according to the intensity of light that is incident upon an optical detector element in the optical detector device during a given time interval is stored in the capacitor. If the first switched is closed at the point in time this given time interval elapses, the charge that has been stored thus far in the capacitor moves to the integrator circuit capacitor in the integrator circuit.

The result is that the voltage at one terminal of the optical detector element changes by $\Delta V$ to assume the reset level, and the integrator output, which is outputted from the integrator circuit, assumes a level according to the charge that was accumulated in the integrator circuit capacitor. When the second switch closes after the first switch has been opened, a voltage determined by the value of the integrator output, outputted from the integrator circuit, is placed into the capacitor in the optical detector element. Because the capacitance of the integrator circuit capacitor is the same as the capacitance of the capacitor in the optical detector element, the result is that the voltage at the terminal on one side of the optical detector element changes from the reset level by an amount equal to $\Delta V$.

For a specific time interval thereafter, the amount of charge that is generated, which depends on the intensity of light that is incident on the optical detector element, is stored in the capacitor. At the point in time this specific time interval elapses, the charge that has been accumulated in the capacitor is the superposition of the charge that is proportional to the voltage that was set according to the value of the integrator output when the second switch was closed, along with the charge that was generated in the optical detector element over the specific time interval. However, because the charges that are superposed have mutually differing signs, when the first switch is closed when this specific time interval elapses, the output of the integrator circuit is dependent on the increase or decrease of the intensity of light that is incident on the optical detector element.

A second optical detector device is equipped with (1) an optical detector part that has an optical detector element that generates charges according to the intensity of incident light, and a capacitor with a capacitance $C_d$, and that accumulates the charges that are generated by the optical detector element; (2) an integrator circuit which has an amplifier and a integrator circuit capacitor equipped in parallel between the input terminal and the output terminal thereof, and which further comprises a capacitance switching means that is able to switch the capacitance of the integrator circuit capacitor between a capacitance $C_d$ and a smaller value, and which accumulates the charge that is inputted into the input terminal in the integrator circuit capacitor and outputs the integrator output, which is dependent on the amount of charge accumulated, from the output terminal; (3) a first switch that is equipped between the optical detector part and the input terminal of the integrator circuit; and (4) a second switch that is equipped between the output terminal of the integrator circuit and the optical detector part.

In this second optical detector device, the charges that are generated depending on the intensity of light that is incident on the optical detector elements of the optical detector part over a specific time interval are accumulated in the capacitors. When a first switch closes as the specific time interval elapses, the charge that has accumulated in the capacitor up until that point moves to the integrator circuit capacitor in the integrator circuit.

As a result, the voltage on one of the terminals of the optical detector element changes by ΔV to assume the reset level, and the integrator output, which is outputted from the integrator circuit, goes to a level that is dependant on the charge that has been accumulated in the integrator circuit capacitor. When the second switch is closed after the first switch has been opened, a voltage, which is dependant on the value of the integrator output that is outputted from the integrator circuit, is set into the capacitor in the optical detector element. At this time, the capacitance switching means has caused the capacitance of the integrator circuit capacitor to be the same as the capacitance of the capacitor in the optical detector element, with the result that the voltage at the one terminal of the optical detector element changes from the reset level by an amount of ΔV.

After this point, the charge that is generated during the specific time interval according to the intensity of light that is incident on the optical detector element is accumulated in the capacitor. After this specific amount of time has elapsed, the charge that has been accumulated in the capacitor is the superposition of the charge that is proportional to the voltage that was set according to the value of the integrator output at the time that the second switch was closed, and the charge that was generated in the optical detector element over the specific time interval.

However, the signs of the charge accumulated are mutually differing. At this point, the capacitance switching means causes the capacitance of the integrator circuit capacitor to assume a value that is smaller than the capacitance of the capacitor in the optical element. Consequently, when the first switch is closed as this time interval elapses, the integration output, which is outputted from the integrator circuit, depends on whether the intensity of incident light on the detector element increased or decreased, and the change in the intensity of light is detected with excellent sensitivity.

In addition, the first and second optical detector devices according to the present invention are also provided with an optical change range detection circuit that detects whether or not the integrator output (voltage) is within a specific range. In this case, the optical change can be obtained as binary data, simplifying the processing from this point forward.

Furthermore, the first and second optical detector devices according to the present invention are further equipped with a CDS (Correlated Double Sampling) circuit, which outputs a CDS output value according to the amount of change in the integrator output value. This eliminates the influence of any offset variation that is included in the integrator output that is outputted from the integrator circuit. In addition to this, preferably an optical change range detector circuit, which detects whether or not the CDS output value is within a specific range, is also provided.

The first and second optical detector devices according to the present invention further comprises a single set consisting of an integrator circuit and first and second switches for all of the plurality of optical detector parts, and the plurality of optical detector parts are connected sequentially to the integrator circuit. Conversely, a single set of an integrator circuit, a first switch, a second switch, and an optical change range detector circuit is equipped for all of the plurality of optical detector parts, and each of the plurality of optical detector parts is connected sequentially to the integrator circuit.

Alternatively, a single set consisting of an integrator circuit, a first switch, a second switch, and a CDS circuit is equipped for all of the plurality of optical detector parts, and the plurality of detector parts are connected sequentially to the integrator circuit. Alternatively, a single set consisting of an integrator circuit, a first switch, a second switch, a CDS circuit and an optical change range detector circuit is equipped for all of the plurality of optical detector parts, and the plurality of optical detector parts are connected sequentially to the integrator circuit.

In each of these cases, the optical detector device can detect increases and decreases in the light intensity for each individual pixel in the image, and is thus able to extract moving objects. The scope of the circuit required for each pixel in this optical detector device is substantially smaller than in conventional technologies. In particular, when the junction capacitance of the optical detector element is used as the capacitor, the size of the circuit is even smaller. Consequently, in this optical detector device, the surface area on the chip required for the circuit part for each pixel is small, so the aperture ratio for each pixel is large, producing superior optical response characteristics.

DESCRIPTION OF THE PREFERRED EMBODIMENT

Forms of embodiment of the present invention will be explained in detail below, referencing the attached drawings. Note that in the descriptions of the drawings, identical codes are used for identical elements, and thus redundant explanations are eliminated.

First Embodiment

A first embodiment of an optical detector device according to the present invention will be explained below.

Figure 1:
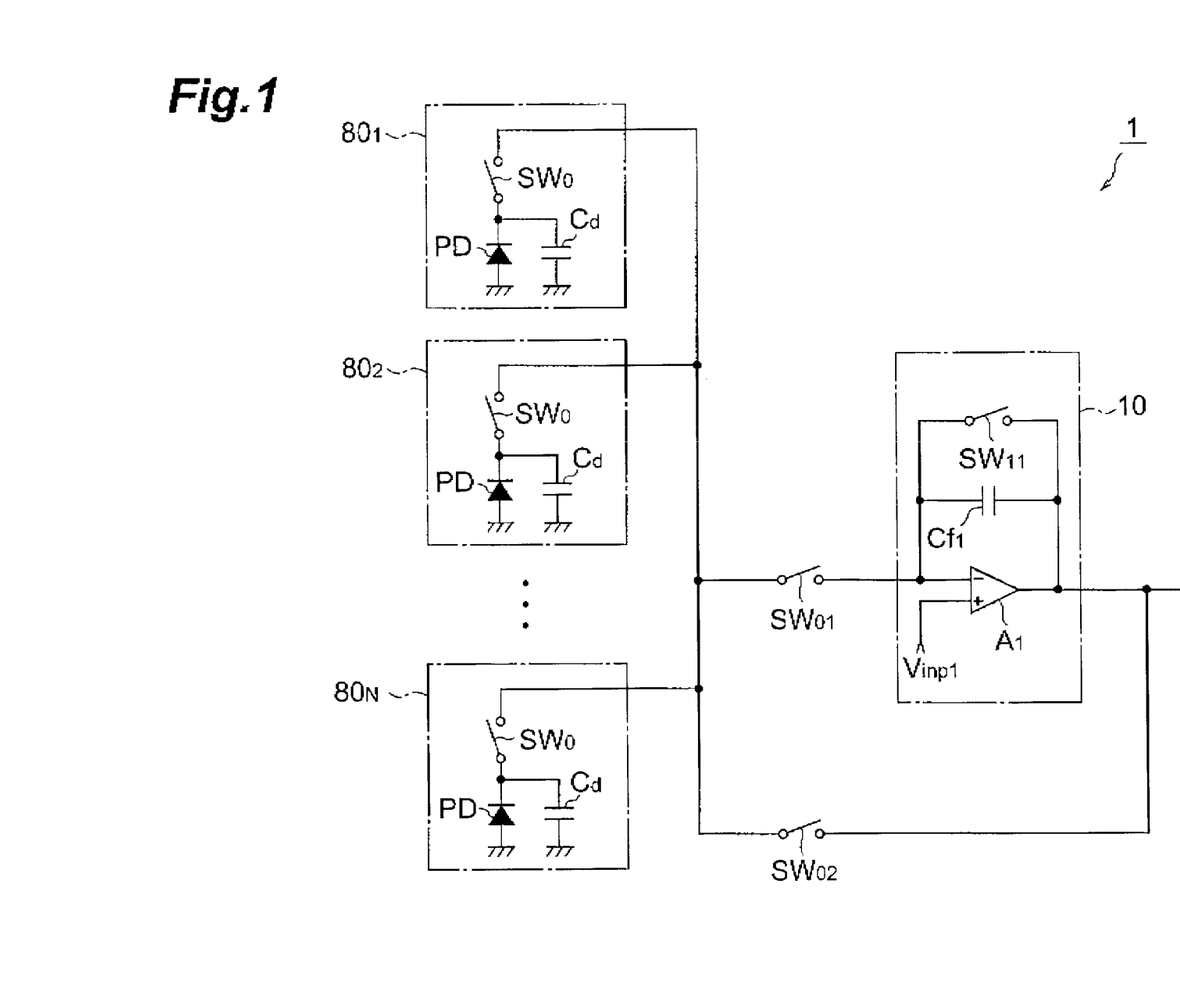
FIG. 1 is a circuit diagram of an optical detector device 1 according to a first embodiment.
Figure 2A:
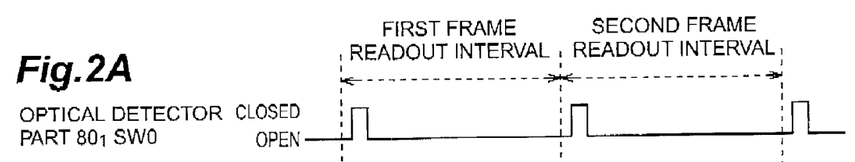
FIGS. 2A, 2B, 2C, 2D, and 2E, are, respectively, timing charts showing the opening and closing timing of the switches $SW_O$ in the respective detector parts $80_1$, $80_2$, $80_3$, $80_n$, and $80_N$.
Figure 2B:
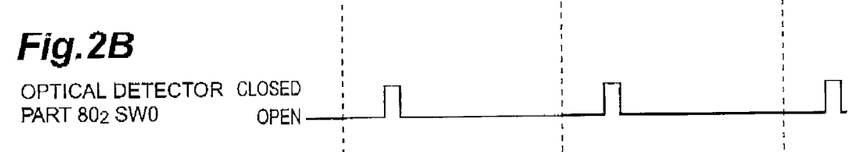
Figure 2C:
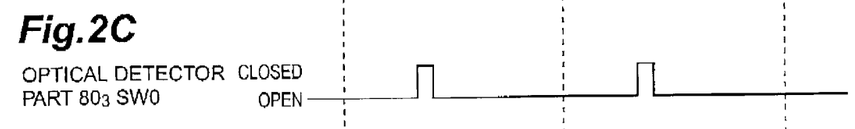
Figure 2D:
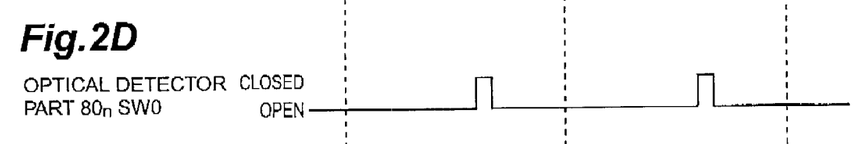
Figure 2E:
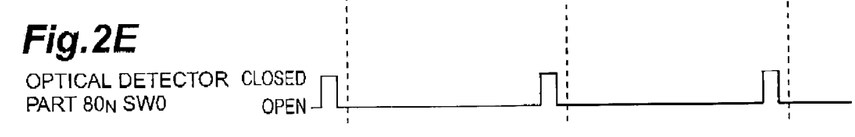

FIG. 1 is a circuit diagram of an optical detector device 1 according to the first embodiment. This optical detector device 1 comprises N optical detector parts $80_1$ through $80_N$, an integrator circuit 10, a first switch $SW_{01}$, and a second switch $SW_{02}$.

The N optical detector parts $80_1$ to $80_N$ each have a photodiode PD, a capacitor $C_d$ and a switch $SW_0$. The anode terminals of the photodiodes PD are connected to ground. The cathode terminals of the photodiodes PD are connected through the capacitor $C_d$ and through the switch $SW_0$ to the switch $SW_{01}$ and the switch $SW_{02}$.

The capacitors $C_d$ of each of the N optical detector parts $80_1$ to $80_N$ all have the same capacitance. Furthermore, the capacitors $C_d$ are the junction capacitances of the photodiodes PD, or may be equipped separately.

An operational amplifier $A_1$, an integrator circuit capacitor $C_{f1}$, and a switch $SW_{11}$, are all equipped in parallel to each other between the input terminal and the output terminal of an integrator circuit 10. The amplifier $A_1$ is connected with its inverted input terminal (−) connected to the switch $SW_{01}$, and its non-inverted input terminal (+) connected to a reference voltage value Vinp1. The integrator circuit capacitor $C_{f1}$, and the switch $SW_{11}$ are connected between the non-inverted input terminal of the amplifier $A_1$ and the output terminal of the integrator circuit 10.

The capacitance for the integrator circuit capacitor $C_{f1}$ is equal to the capacitance of the capacitor $C_d$ for each of the N optical detector parts $80_1$ to $80_N$. The integrator circuit 10 is initialized (reset) by discharging its accumulated charge of the integrator circuit capacitor $C_{f1}$ when the switch $SW_{11}$ is closed.

On the other hand, when the switch $SW_{11}$ is opened, the integrator circuit 10 accumulates the charge that is inputted into the input terminal (−) in the integrator circuit capacitor $C_{f1}$, and outputs a voltage (termed a "integrator output"), which is dependent on the charge that is accumulated, from the output terminal.

The switch $SW_{01}$ is equipped between the switch $SW_0$ and the input terminal (−) of the integrator circuit 10 in each of the N optical detector parts $80_1$ to $80_N$. The switch $SW_{02}$ is equipped between the output terminal of the integrator circuit 10 and the switch $SW_0$ for each of the N optical detector parts $80_1$ to $80_N$.

Note that the control signals that control the opening and closing of each of the switches $SW_0$, $SW_{01}$, and $SW_{02}$ of each of the N optical detector parts $80_1$ to $80_N$, and of the switch $SW_{11}$ of the integrator circuits 10 are output with a specific timing from a timing control circuit (not shown) that controls the operation of this optical detector circuit 1.

The operation of the optical detector device 1 in the present embodiment will be explained next.

FIGS. 2A, 2B, 2C, 2D, and 2E are timing charts showing the timing of the opening and closing of the switches $SW_0$ of the respective detector parts $80_1$, $80_2$, $80_3$, $80_n$ and $80_N$.

Note that the total number of optical detector parts is N, and a single frame is formed by laying these optical parts out in a 1-dimensional or 2-dimensional array. As is shown in the figures, during the time intervals wherein the charge accumulated in each frame is read out (a first frame readout interval and a second frame readout interval), the switches $SW_0$ for each of the N optical detector parts $80_1$ to $80_N$ are sequentially closed momentarily and sequentially opened.

In other words, the present device is equipped with one set, comprising an integrator circuit 10, a first switch $SW_{01}$, and the aforementioned second switch $SW_{02}$, for all of the plurality of optical detector parts $80_1$ to $80_N$, and each of the plurality of optical detector parts $80_1$ to $80_N$ is sequentially connected to the integrator circuit 10.

Over the time interval wherein the switch $SW_0$ for any given optical detector part $80_n$ is closed, the photodiode PD and the capacitor $C_d$ of said given optical detector part $80_n$ are connected to the input terminal (−) of the integrator circuit 10 through the switch $SW_{01}$ if the switch $SW_{01}$ is closed, or are connected to the integrator circuit 10 through the switch $SW_{02}$ if the switch $SW_{02}$ is closed.

Additionally, during the time interval in which the switch $SW_0$ of any given optical detector part $80_n$ is open, the charge that is generated in the photodiode PD for said given optical detector part $80_n$ is accumulated in the capacitor $C_d$ of said given optical detector part $80_n$.

Figure 10A:
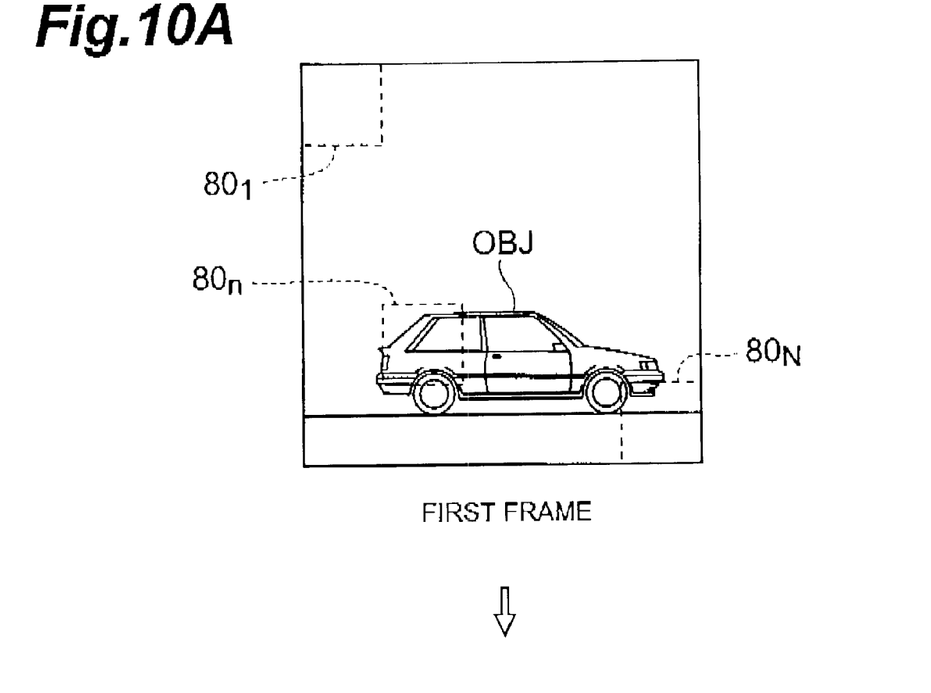
FIGS. 10A and 10B are diagrams showing first and second frames.
Figure 10B:
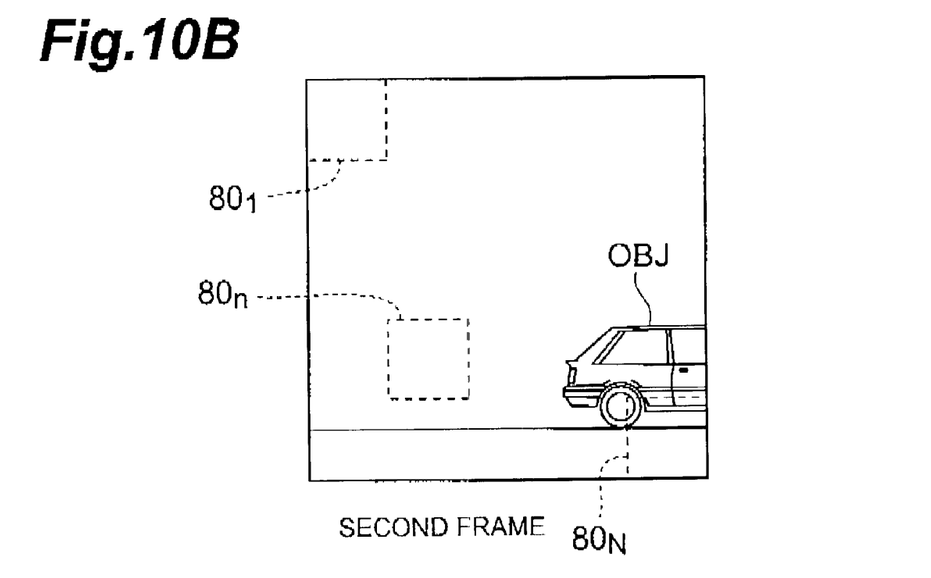

In other words, as is shown in FIGS. 10A and 10B, the optical detector parts $80_1$ to $80_N$ are laid out in, for example, two dimensions, and the readout for the second frame begins after the readout of the first frame has been completed, and when one looks, in particular, at the optical detector part $80_n$, there will be a differential amount of charge accumulating in the capacitor $C_d$ in frame 2 from what there was in frame 1 if there is a object OBJ moving in the frame, and thus it can be seen by calculating the charge differential that the object OBJ has moved.

FIGS. 3A, 3B, 3C, 3D, 3E, 3F, 3G, and 3H are timing charts showing the timing of operations of the optical detector device 1 for an nth optical detector part $80_n$.

Figure 3A:
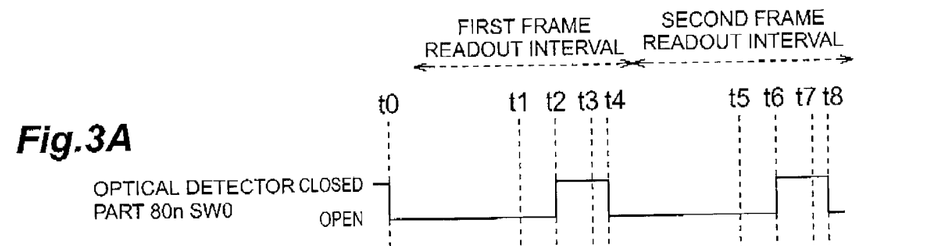
FIGS. 3A, 3B, 3C, 3D, 3E, 3F, 3G and 3H are timing charts showing the timing of operations in the optical detector device 1 for the nth optical detector part $80_n$, in particular.
Figure 3B:
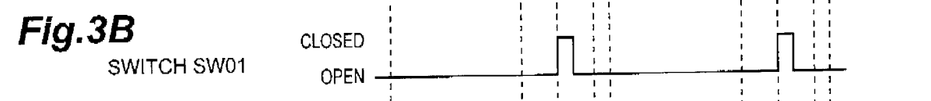
Figure 3C:
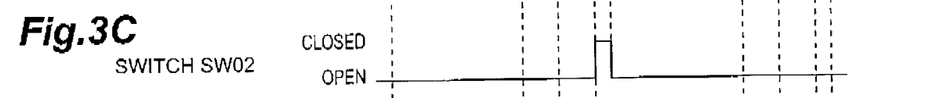
Figure 3D:
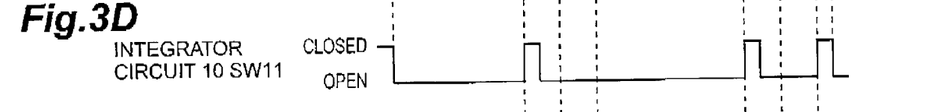
Figure 3E:
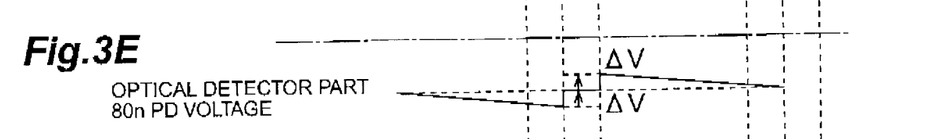
Figure 3F:
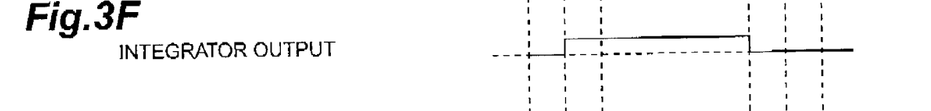
Figure 3G:
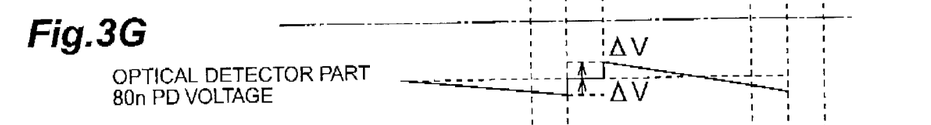
Figure 3H:
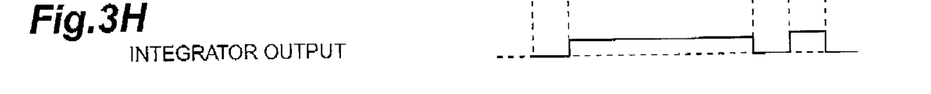

FIGS. 3A, 3B, 3C, and 3D show the opening and closing timing of the various switches. FIGS. 3E and 3F show the case wherein the intensities of light detected by the optical detector part $80_n$ are equal during the first frame readout interval and the second frame readout intervals. Additionally, FIGS. 3G and 3H show the various signal levels when the intensity of light detected by the optical detector part $80_n$ during the second frame readout interval is greater than during the first frame readout interval.

The operations in the cases where the intensity of light detected by the optical detector part $80_n$ during the first frame readout interval and the second frame readout interval are the same will be explained using FIGS. 3A through 3F.

The switch $SW_0$ of the optical detector part $80_n$ is opened at time t0. At time t0 there is no charge stored in the capacitor $C_d$ of the optical detector part $80_n$, and the voltage at the cathode terminal of the photodiode PD for the optical detector part $80_n$ is at the reset level. From time t0 until time t2, at which time the switch $SW_0$ is closed, the charge generated in the photodiode PD of said given optical detector part $80_n$ is accumulated in the capacitor $C_d$ of said given optical detector part $80_n$.

At a time t1, between time t0 and time t2, the charge that is accumulated in the integrator capacitor $C_{f1}$ in the integrator circuit 10 is discharged and initialized by briefly closing and then opening the switch $SW_{11}$ of the integrator circuit 10, so that the integrator output voltage that is outputted goes to the reset level.

The switch $SW_0$ of the optical detector part $80_n$ is closed from time t2 to time t4 in the first frame. During this interval, first the switch $SW_{01}$ is briefly closed and then opened at time t2, and then the switch $SW_{02}$ is briefly closed and then opened at time t3. During the interval in which the switch $SW_{01}$ is closed, the charge that is accumulated in the capacitor $C_d$ of the optical detector part $80_n$ moves to the integrator circuit capacitor $C_{f1}$ of the integrator circuit 10.

The result is that the voltage at the cathode terminal of the photodiode PD of the optical detector part $80_n$ changes by an amount $\Delta V$ to go to the reset level, and the integrator output voltage outputted from the integrator circuit 10 goes to a level that is dependent on (proportional to) the charge that is accumulated in the integrator circuit capacitor $C_{11}$.

Afterwards, during the interval over which the switch $SW_{02}$ is closed, the voltage from the output terminal of the integrator circuit 10 is returned to the capacitor $C_d$, or, in other words, an amount of charge that depends on the integrator output voltage that is outputted from the integrator circuit 10 is stored in the capacitor $C_d$ of the optical detector part $80_n$. The capacitance of the integrator circuit capacitor $C_{f1}$ is the same as the capacitance for the capacitor $C_d$ of the optical detector part $80_n$, and thus the result is that the voltage of the cathode terminal of the photodiode PD of the optical detector part $80_n$ changes from the reset level by an amount equal to $\Delta V$.

The switch $SW_0$ of the optical detector part $80_n$ is opened at time t4. At time t4, the voltage of the cathode terminal of the photodiode PD of the optical detector part $80_n$ is $\Delta V$. Prom time t4 until time t6 (when the switch $SW_0$ is closed), the charge that is generated in the photodiode PD of the optical detector part $80_n$ is accumulated in the capacitor $C_d$ of the optical detector part $80_n$. At a time t5, between time t4 and time t6, the integrator circuit 10 switch $SW_{11}$ is briefly closed and then opened, the integrator circuit 10 is initialized as the result of the charge in the integrator circuit capacitor $C_{f1}$ being discharged, causing the integrator output voltage outputted to go to the reset level.

If the interval between time t0 and time t2 is equal to the interval between time t4 and time t6, and if the intensity of light that is detected by the optical detector part $80_n$ during the first frame is the same as during the second frame, then the charge that is accumulated in the capacitor $C_d$ of the optical detector part $80_n$ at time t6 will be such that the charge that is accumulated according to the integrator output voltage that is outputted from the integrator circuit 10 at time t3 cancels out the charge that is generated in the photodiode PD during the interval from time t4 to time t6. Consequently, at time t6 the voltage at the cathode terminal of the photodiode PD of the optical detector part $80_n$ will go to the reset level.

During the interval from time t6 to time t8 in the interval over which the second frame is read out, the switch $SW_0$ of the optical detector part $80_n$ is closed. At time t6 during this interval, the switch $SW_{01}$ is briefly closed and then opened. At time t6, when the switch $SW_{01}$ is closed, there will be no charge stored in the capacitor $C_d$ of the optical detector $80_n$ and the voltage at the cathode terminal of the photodiode PD of the optical detector part $80_n$ will be at the reset level, and thus the integrator output outputted by the integrator circuit 10 will be at the reset level. In other words, if the intensity of light that is detected by the optical detector part $80_n$ is the same in the first frame as it is in the second frame, then, after time t6 when the second frame is being read out, the integrator output outputted from the integrator circuit 10 will be at the reset level.

Next, FIGS. 3A, 3B, 3C, 3D, 3G, and 3H will be referenced in order to explain the operations when the intensity of light detected by the optical detector part $80_n$ is greater in the second frame than in the first frame.

The opening and closing operations of the various switches are the same as have already been described. If the interval between time t0 and time t2 is equal to the interval between time t4 and time t6, and if the intensity of light detected by the optical detector part $80_n$ during the second frame readout interval is larger than during the first frame readout interval, then the charge that is accumulated in the capacitor $C_d$ of the optical detector part $80_n$ at the time t6 will be such that the charge that is accumulated according to the integrator output voltage outputted by the integrator circuit 10 and time t3 and the charge that is generated in the photodiode PD during the interval from the time t4 to time t6 will not cancel each other out. Consequently, at time t6 the voltage at the cathode terminal of the photodiode PD of the optical detector part $80_n$ will be at a level lower than the reset level.

The switch $SW_0$ of the optical detector part $80_n$ is closed during the interval from time t6 to time t8 during the second frame readout interval. At time t6 during this interval, the switch $SW_{01}$ is briefly closed and then opened. At time t6 when the switch $SW_{01}$ is closed, the voltage at the cathode terminal of the photodiode PD of the optical detector part $80_n$ is lower than the reset level, so the integrator output outputted from the integrator circuit 10 is higher than the reset level.

In other words, if the intensity of light detected by the optical detector part $80_n$ is not the same in the first frame as it is in the second frame, then, beginning at the time t6 during the second frame readout interval, the integrator output outputted from the integrator circuit 10 will be at a level that is different from the reset level. After the integrator output is read after time t6, the switch $SW_{11}$ of the integrator circuit 10 is briefly closed and then opened at the time t7, resetting the integrator circuit 10.

As described above, the integrator output voltage outputted beginning at the time t6 from the integrator circuit 10 of the optical detector device 1 according to the present embodiment will be dependent on the difference in the intensity of light from one frame to the next frame detected by the photodiode PD in each of the N optical detector parts $80_1$ through $80_N$. In other words, this optical detector device 1 is able to detect increases or decreases in the intensity of light in each of the pixels in an optical image and is thus able to extract moving objects there from.

In this optical detector device 1, the only elements required for every pixel are the photodiode PD, the capacitor $C_d$ and the switch $SW_0$, and thus, when compared to the conventional technology, the scope of the circuit is substantially reduced. In particular, when the junction capacitance of the photodiode PD is used as the capacitance $C_d$, it is possible to reduce the size of the circuit even further. Consequently, in this optical detector device 1, the area occupied by the circuit part for each pixel is small, so the aperture ratio for each pixel is high, resulting in superior optical response characteristics.

Second Embodiment

Next a second embodiment of the optical detector device according to the present invention will be explained.

Figure 4:
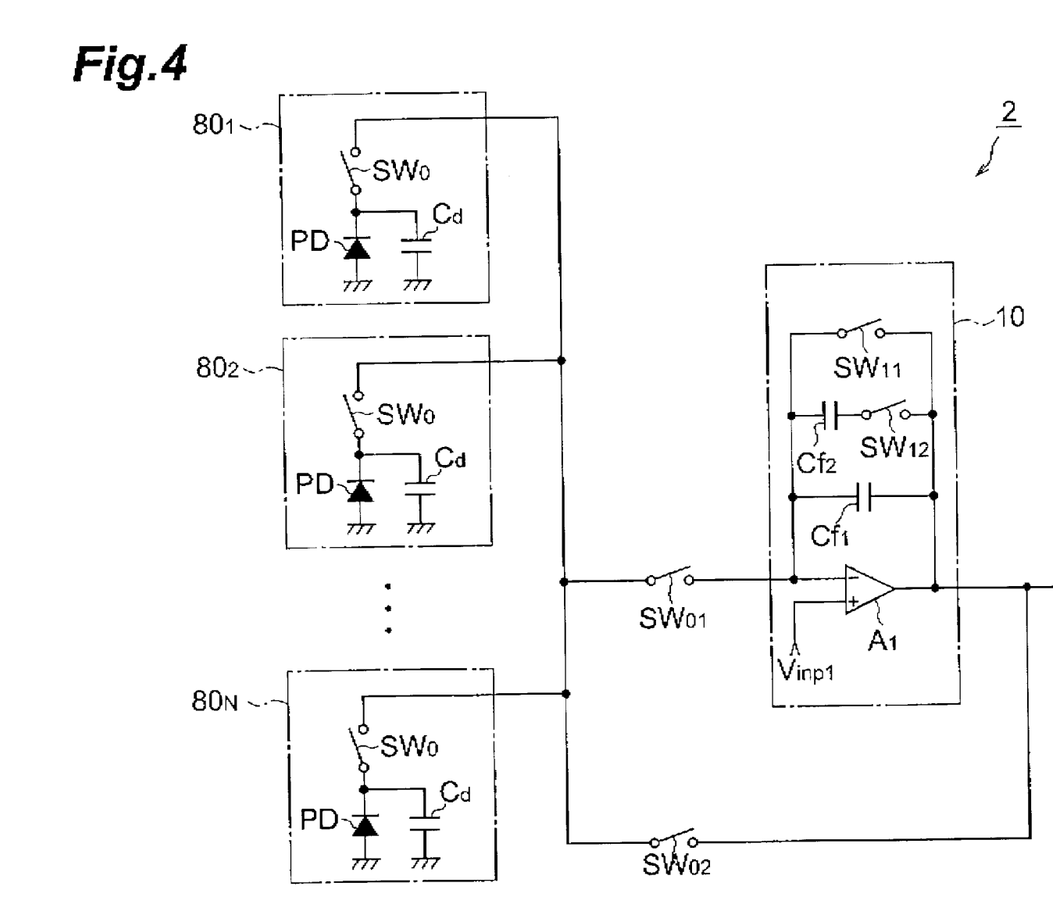
FIG. 4 is a circuit diagram of an optical detector device 2 according to a second embodiment.

FIG. 4 is a circuit diagram of an optical detector device 2 according to the second embodiment.

The optical detector device 2 according to the second embodiment, when compared to the optical detector device of the first embodiment, has a different circuit structure in the integrator circuit 10.

In the integrator circuit 10 of the optical detector device 2 an amplifier $A_1$, an integrator circuit capacitor $C_{f1}$, and a switch $SW_{11}$ are connected in parallel with each other between the input terminal and the output terminal, connected in parallel to a switch $SW_{12}$ (a capacitance switching means) and an integrator circuit capacitor $C_{f2}$, which are connected in series with each other. The amplifier $A_1$ is connected so that its inverted input terminal (−) is connected to the switch $SW_{01}$, and its non-inverted input terminal (+) is at the reference voltage value Vinp1.

The switch $SW_{12}$ and the integrator circuit capacitor $C_{12}$, which are connected in series with each other, the integrator circuit capacitor $C_{f1}$, and the switch $SW_{11}$ are all equipped between the inverted input terminal and the output terminal of the amplifier $A_1$. The sum of the individual capacitance (combined capacitance) of the integrator circuit capacitor $C_{f1}$ and the integrator circuit capacitor $C_{f2}$ is equal to the capacitance of the individual capacitors $C_d$ of the N optical detector parts $80_1$ to $80_N$.

The control signals that control the opening and closing operations of the individual switches $SW_0$, $SW_{01}$, and $SW_{02}$, of the N optical detector parts $80_1$ to $80_N$, and the switches $SW_{11}$ and $SW_{12}$ of the integrator circuit 10 are outputted with a specific timing from a timing control circuit (not shown), which controls the operations of this optical detector circuit 2.

Next, the operations of the optical detector device 2 according to the present embodiment will be explained. The opening/closing timing of the individual switches $SW_0$ in the N optical detector parts $80_1$ to $80_N$ is the same as explained using FIGS. 2A through 2E.

FIGS. 5A, 5B, 5C, 5D, 5E, 5F, 5G, 5H, and 5I are timing charts showing the timing of operations in the optical detector device 2 for, in particular, the nth optical part $80_n$.

Figure 5A:
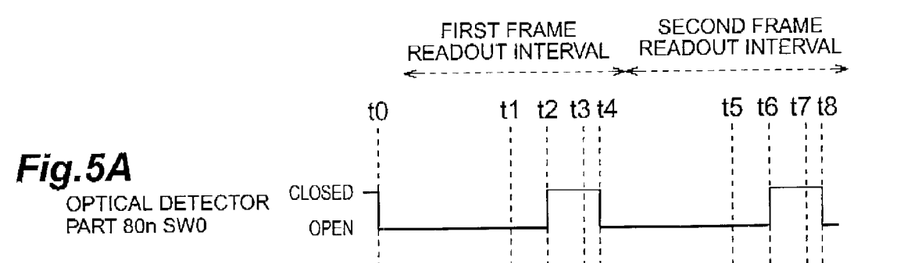
FIGS. 5A, 5B, 5C, 5D, 5E, 5F, 5G, 5H, and 5I are timing charts showing the timing of operations in the optical detector device 2 for the nth optical detector $80_n$, in particular.
Figure 5B:
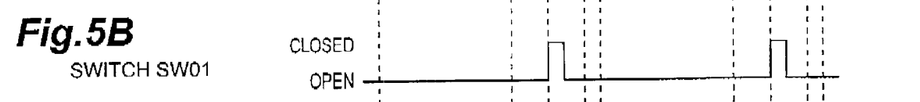
Figure 5C:
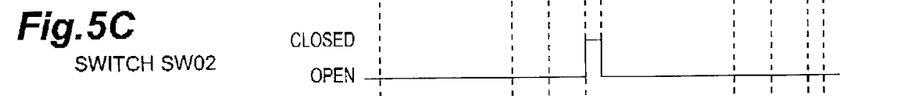
Figure 5D:
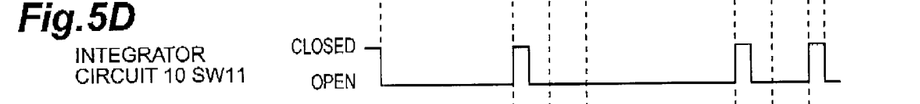
Figure 5E:
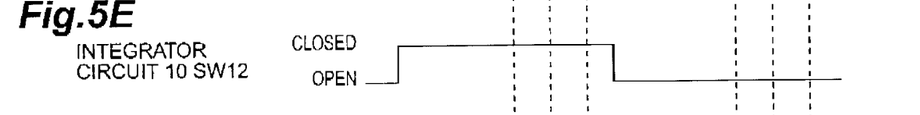
Figure 5F:
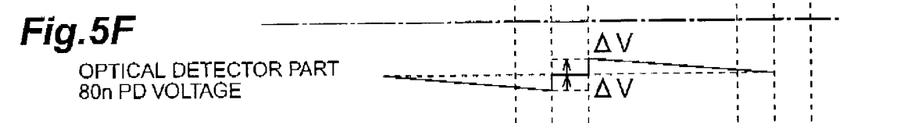
Figure 5G:
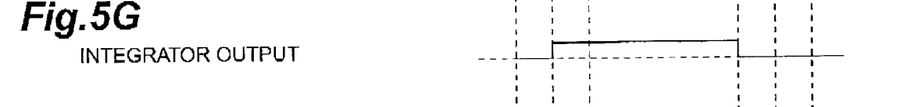
Figure 5H:
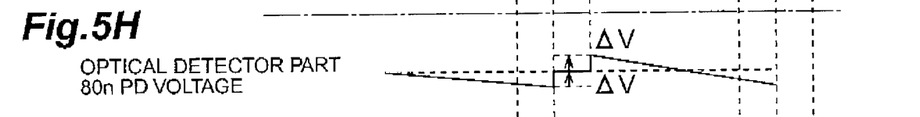
Figure 5I:
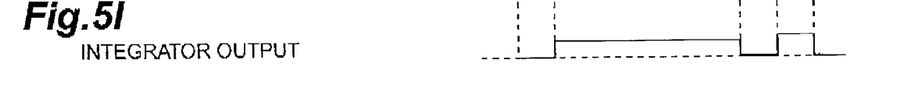

FIGS. 5A, 5B, 5C, 5D, and 5E show the timing of the opening and closing of various switches. FIGS. 5F and 5G show the output levels when the intensity of light detected by the optical detector part $80_n$ is the same in the first frame as in the second frame. Additionally, FIGS. 5H and 5I show the outputs when the intensity of light detected by the optical detector part $80_n$ in the second frame is greater than in the first frame.

The operations of this optical detector device 2 are essentially the same as the operations of the optical detector device 1 according to the first embodiment. In the present embodiment, the switch $SW_{12}$ of the integrator circuit 10 is closed in the first frame and open in the second frame.

In the first frame readout interval (until the time t4 is passed), over which the switch $SW_{12}$ of the integrator circuit 10 is closed, the charge that accumulates in the integrator circuit 10 is stored in both the first integrator circuit capacitor $C_{f1}$ and the second integrator circuit capacitor $C_{12}$, which are equipped in parallel with each other. Furthermore, the sum of the individual capacitances of the first integrator circuit capacitor $C_{f1}$ and the second integrator circuit capacitor $C_{f2}$ is equal to the capacitance of the capacitor $C_d$ of the optical detector part $80_n$. As a result, during the interval that this first frame is read out, the operations of the optical detector device 2 are the same as were explained using FIGS. 3A through 3H.

On the other hand, during the second frame readout interval (until time t8), wherein the switch $SW_{12}$ of the integrator circuit 10 is open, the charge that is accumulated in the integrator circuit 10 is accumulated in the first integrator circuit capacitor $C_{f1}$ only, so the capacitance is smaller. Consequently, when one assumes a change in the intensity of light before and after said frame readout interval that is the same as in the first embodiment, then the integrator output voltage outputted from the integrator circuit 10 beginning at time t6 in the second optical detector device 2 of the present embodiment will be increased, when compared to the first embodiment, by a factor of $((C_{f1}+C_{f2})/C_{f1})$, increasing the sensitivity As described above, the optical detector device 2 according to the present embodiment not only has effects that are the same as are provided by the optical detector device 1 in the first embodiment, but also, by making the capacitance of the integrated circuit capacitor of the integrator circuit 10 during the second frame readout interval smaller than that of the first frame readout interval, it is possible to perform detection with a high sensitivity to changes in the intensity of light for each pixel in the optical image, and thus it is possible to extract the moving objects with high sensitivity.

Third Embodiment

A third embodiment of an optical detector device according to the present invention will be explained next.

Figure 6:
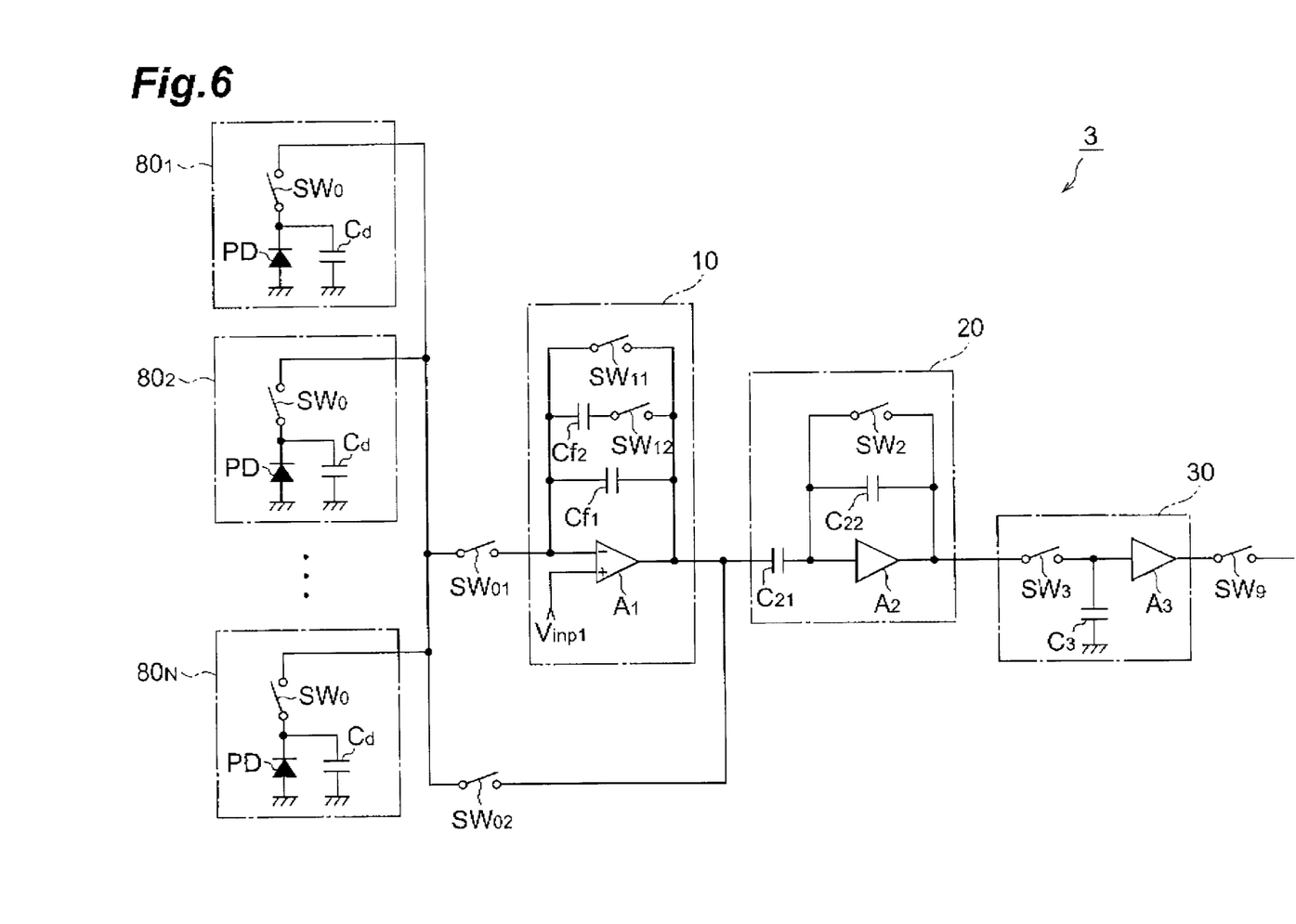
FIG. 6 is a circuit diagram of an optical detector device 3 according to a third embodiment.

FIG. 6 is a circuit diagram of an optical detector device 3 according to the third embodiment.

The optical detector device 3 according to the third embodiment, when compared with the second embodiment, has an added CDS circuit 20 and a sample and hold circuit 30.

The CDS circuit 20 has a capacitor (capacitive element) $C_{21}$ and an operational amplifier $A_2$ in series between the input terminal and the output terminal. Additionally, a switch $SW_2$ and a capacitor (capacitive element) $C_{22}$ are connected in parallel between the input terminals of the amplifier $A_2$. The CDS circuit 20 is initialized (reset) by discharging the accumulated charge of the capacitor $C_{22}$ when the switch $SW_2$ is closed.

On the other hand, in the CDS circuit 20, when the switch $SW_2$ is open, the charge that is inputted through the capacitor $C_{21}$ from the input terminal is accumulated in the capacitor $C_{22}$, and a voltage, known as the "CDS output," and which is dependent on the charge accumulated therein, is outputted from the output terminal. This CDS output (voltage) is dependent on the amount of change in the integrator output voltage outputted from the integrator circuit 10.

In other words, this device is equipped with a CDS circuit that outputs a CDS output that has a value that is dependent upon the amount of change in the output voltage of the integrator circuit 10.

The sample and hold circuit 30 has a switch $SW_3$ and an operational amplifier $A_3$ in series between the input and output terminals, where the contact point between the switch $SW_3$ and the amplifier $A_3$ is through the capacitor (capacitive element) $C_3$. This sample and hold circuit 30 stores (accumulates) in the capacitor $C_3$ the CDS output (charge) that was inputted into the input terminal when the switch $SW_3$ was closed, and even after the switch $SW_3$ is opened, it maintains the CDS output that is stored in the capacitor $C_3$, and by connecting a switch $SW_9$, it outputs this CDS output to the output terminal through the amplifier $A_3$.

The switch $SW_9$ is connected to the output terminal of the sample and hold circuit 30, determining whether or not the CUD output, which is held in the sample and hold circuit 30 and outputted from the output terminal, is outputted to the next stage.

Note that the control signals that control the opening and closing actions of the switches $SW_0$, $SW_{01}$ and $SW_{02}$ of each of the N optical detector parts $80_1$ through $80_N$, the switches $SW_{11}$ and $SW_{12}$ of the integrator circuit 10, switch $SW_2$ of the CDS circuit 20, and switches $SW_3$ and $SW_9$ of the sample and hold circuit 30 are outputted with a specific timing from a timing control circuit (not shown), which controls the operations of this optical detector circuit 3.

In this device, a single set comprising the integrator circuit 10, the first switch $SW_{01}$, the second switch $SW_{02}$, and the CDS circuit 20 is provided for all of the plurality of the optical detector parts $80_1$ to $80_N$, and each of the plurality of optical detector parts $80_1$ through $80_N$ are connected sequentially to the integrator circuit 10.

Next will be explained the operations of the optical detector device 3 according to the present embodiment. The timing of the opening and closing of the respective switches $SW_0$ of the N optical detector parts $80_1$ to $80_N$ is the same as was explained for FIGS. 2A through 2E.

FIGS. 7A, 7B, 7C, 7D, 7E, 7F, 7G, 7H, 7I, 7J, 7K, 7L and 7M are timing charts showing the timing operations in the optical detector device 3 for an nth optical detector part $80_n$, in particular.

Figures 7A, 7B:
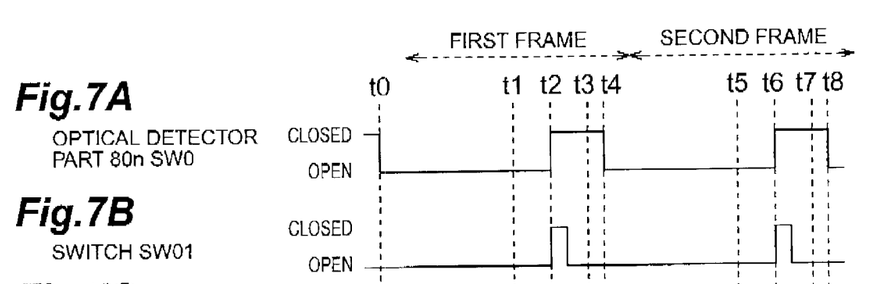
FIGS. 7A, 7B, 7C, 7D, 7E, 7F, 7G, 7H, 7I, 7J, 7K, 7L, and 7M are timing charts showing the timing of operations in the optical detector device 3 for the nth optical detector part $80_n$, in particular.
Figure 7C:
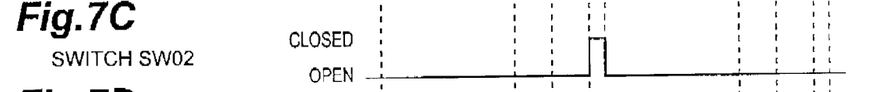
Figure 7D:
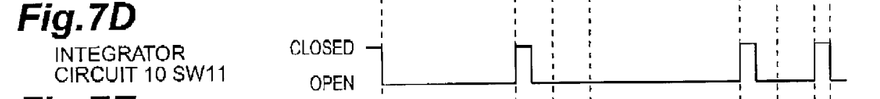
Figure 7E:
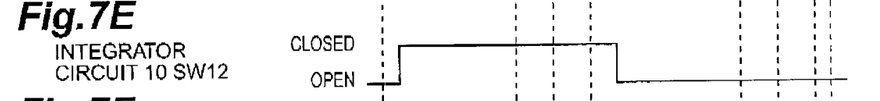
Figure 7F:
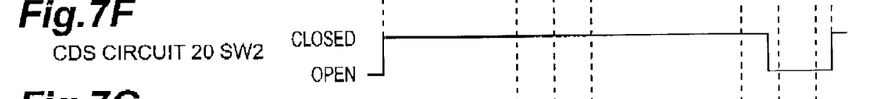
Figures 7G, 7H:
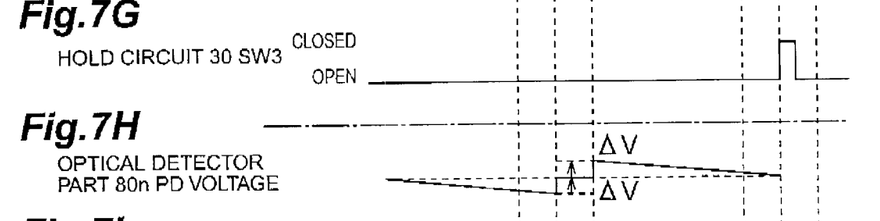
Figure 7I:
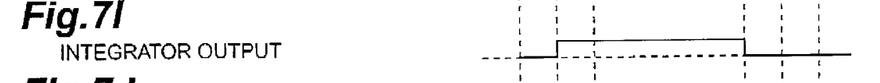
Figure 7J:
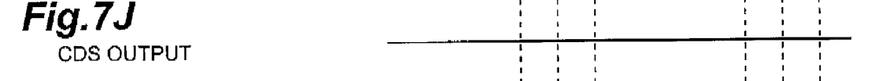
Figures 7K, 7L:
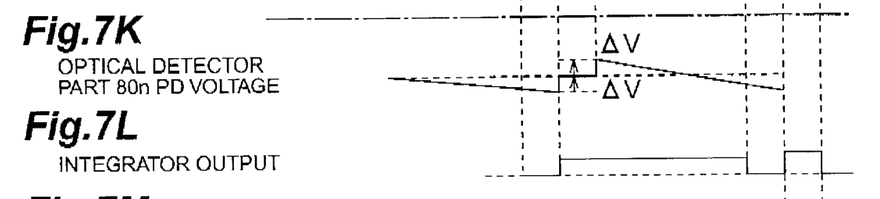
Figure 7M:
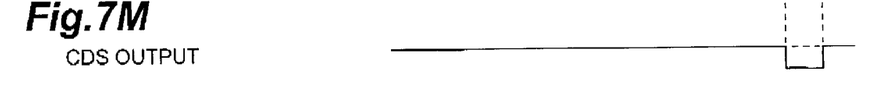

FIGS. 7A, 7B, 7C, 7D, 7E, 7F, and 7G show the opening/closing timing for the various switches. FIGS. 7H, 7I, and 7J show the output levels when the intensity of light detected by the optical output part $80_n$ is the same during the first frame readout interval as during the second frame readout interval. FIGS. 7K, 7L, and 7M show the output levels when the intensity of light detected by the optical detector part $80_n$ is greater during the second frame readout interval than during the first frame readout interval.

The operation of the optical detector device 3 is essentially the same as the operation of the optical detector device 2 according to the second embodiment.

In the present embodiment, a switch $SW_2$ of the CDS circuit 20 is opened prior to time t6 after the reset has been completed by closing the switch $SW_{11}$ of the integrator circuit 10 briefly at time t5, and then is closed at time t8. The switch $SW_3$ of the sample and hold circuit 30 is closed at time t6, and then is opened immediately.

The integrator output voltage that is outputted from the integrator circuit 10 is at the reset level until the time t6, and from the time t6 forward the level is dependent upon the difference in the intensity of light detected from one frame to the next frame of each of the photodiodes PD in the N optical detector parts $80_1$ to $80_N$.

Additionally, the CDS output outputted from the CDS circuit 20 depends on the amount of change in the value of the integrator output voltage after the switch $SW_2$ is opened. Consequently, the CDS output, described above, is at the reset level prior to the time t6, and then from the time t6 forward it depends on the amount of change in the integrator output voltage at the time t6.

In other words, the CDS output from time t6 forward is a level that depends on the difference in the intensity of light detected from one frame to the next by each of the photodiodes PD of the N optical detector parts $80_1$ to $80_N$. In addition, the CDS output at the point in time when the switch $SW_3$ was opened after it was closed briefly is held and outputted by the sample and hold circuit 30. Consequently, this optical output device 3 is able to detect an increase or decrease in the light intensity in each pixel in an optical image based on the CDS output that was outputted from the CDS circuit 20 or the sample and hold circuit 30, and is thereby able to extract moving objects.

As described above, the optical detector device 3 according to the present embodiment, in addition to having the same effects as the optical detector device 2 according to the second embodiment, is also enabled by CDS circuit 20 to exclude the influence of variations in the offset included in the integrator output that is outputted from the integrator circuit 10, and thus is able to detect with high precision increases or decreases in the light intensity in each of the individual pixels in an optical image, and is thus able to extract the moving objects with high precision.

Fourth Embodiment

A fourth embodiment of an optical detector device according to the present invention will be explained next.

Figure 8:
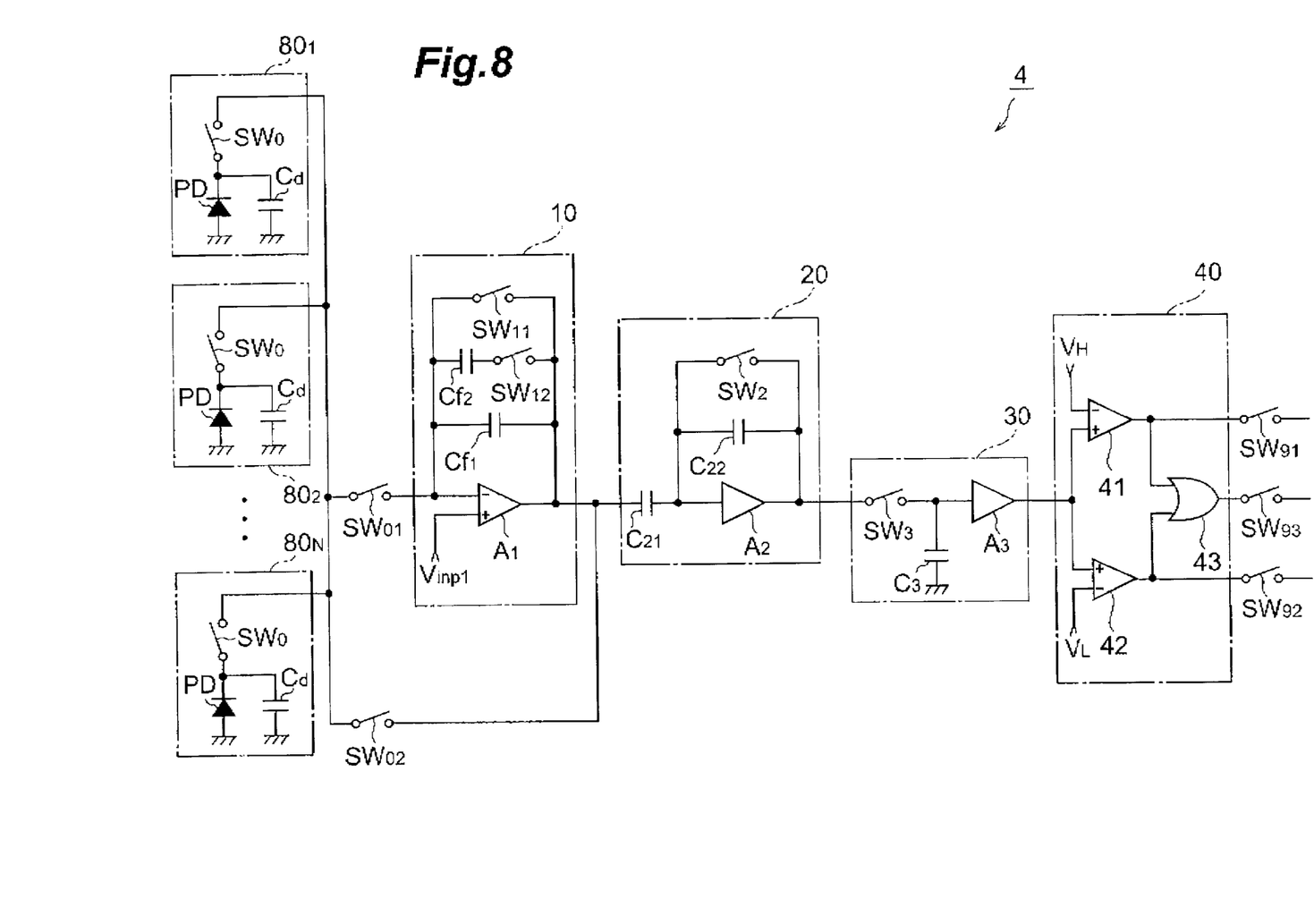
FIG. 8 is a circuit diagram showing an optical detector device 4 according to a fourth embodiment.

FIG. 8 is a circuit diagram of an optical detector device 4 according to the fourth embodiment.

The optical detector device 4 according to the fourth embodiment is the result of adding an optical change range detector circuit 40 to the optical detector device of the third embodiment.

The light intensity variance range detector circuit 40 comprises comparator circuits 41 and 42 and a logical AND circuit 43. The comparator circuit 41 inputs the CDS output (voltage) outputted from the sample and hold circuit 30, inputs a reference signal voltage $V_H$, compares the magnitudes of two voltages, and if the CDS output (voltage) is equal to or greater than the reference signal voltage $V_H$, then the aforementioned comparator circuit 41 outputs a logical H value, and otherwise outputs a logical L value.

The comparator circuit 42 inputs the CDS output (voltage) that is outputted from the sample and hold circuit 30, inputs a reference signal voltage $V_L$, compares the magnitudes of the voltages for each, and if the CDS output (voltage) is less than or equal to the reference signal voltage $V_L$, the aforementioned comparator circuit 42 outputs a logical H value, and if not, outputs a logical L value.

The logical AND circuit 43 performs a logical AND on the logical outputs that are outputted from the comparator circuits 41 and 42, and outputs a logical output that indicates the logical sum. In other words, the logical AND circuit 43 outputs a logical H level if the CDS output is greater than or equal to the references signal voltage $V_H$, or if the CDS output is less than or equal to the reference signal voltage $V_L$.

A switch $SW_{91}$ is connected to the output terminal of the comparator circuit 41, and determines whether or not the logical output that is outputted from the comparator circuit 41 is outputted to the next stage. A switch $SW_{92}$ is connected to the output terminal of the comparator circuit 42, and determines whether or not a logical output that is outputted from the comparator circuit 42 is outputted to the next stage. A switch $SW_{93}$ is connected to the output terminal of the logical AND circuit 43, and determines whether or not the logical output that is outputted from the logical AND circuit 43 is outputted to the next stage.

In this optical detector device 4, the increase or decrease in the light intensity for each pixel in an optical image can be detected with high precision based on the logical values of the logical outputs that are outputted from the comparator circuits 41 and 42, and from the logical AND circuit 43.

If the logical output that is outputted from the comparator circuit 41 is a logical H, then it is determined that the intensity of light detected by the photodiode PD for that pixel has increased by at least a specific amount.

If the logical output that is outputted from the comparator circuit 42 is a logical H, then it is determined that the intensity of light detected by the photodiode PD of that pixel has decreased by at least a specific amount.

If the logical output that is outputted by the logical AND circuit 43 is a logical H, then it is determined that the change in the intensity of light that is detected by the photodiode PD of the pixel is more than a specific amount, or in other words, it is determined that the output voltage of the integrator circuit 10 is outside of a specific range.

On the other hand, if the logical output that is outputted from the logical AND circuit 43 is a logical L, then it is determined that the change in the intensity of light that is detected by the photodiode PD of that pixel is less than a specific amount, or, in some cases, that the light intensity is at about the noise level, or in other words, that the output voltage of the integrator circuit 10 is within a specific range.

As explained above, in addition to having the same effects as the optical detector device 3 of the third embodiment, the optical detector device 4, because it is equipped also with an optical change range detector circuit 40 that detects whether or not the output voltage of the integrator circuit 10 falls within a specific range, is able to obtain, as binary data, increases or decreases in the light intensity for each pixel in an optical image, and is thus able to extract moving objects easily.

Note that the present device is equipped with a single set comprising the integrator circuit 10, the first switch $SW_{O1}$, the second switch $SW_{O2}$ and the light intensity variance range detector circuit 40, for all of the plurality of optical detector parts $80_1$ to $80_N$, where each of the plurality of optical detector parts $80_1$ to $80_N$ are connected sequentially to the integrator circuit 10.

Furthermore, for all of the plurality of optical detector parts $80_1$ to $80_N$, a single set comprising the integrator circuit 10, the first switch $SW_{O1}$, a second switch $SW_{O2}$, and the CDS circuit 20 is provided, where each of the plurality of optical detector parts $80_1$ to $80_N$ are connected sequentially to the integrator circuit 10.

Stated differently, the present device is equipped with a single set comprising the integrator circuit 10, the first switch $SW_{O1}$, the second switch $SW_{O2}$, the CDS circuit 20, and the light intensity variance range detector circuit 40, for all of the plurality of optical detector parts $80_1$ to $80_N$, with each of the plurality of optical detector parts $80_1$ to $80_N$ connected sequentially to the integrator circuit 10.

Fifth Embodiment

A fifth embodiment of an optical detector device according to the present invention will be explained next.

Figure 9:
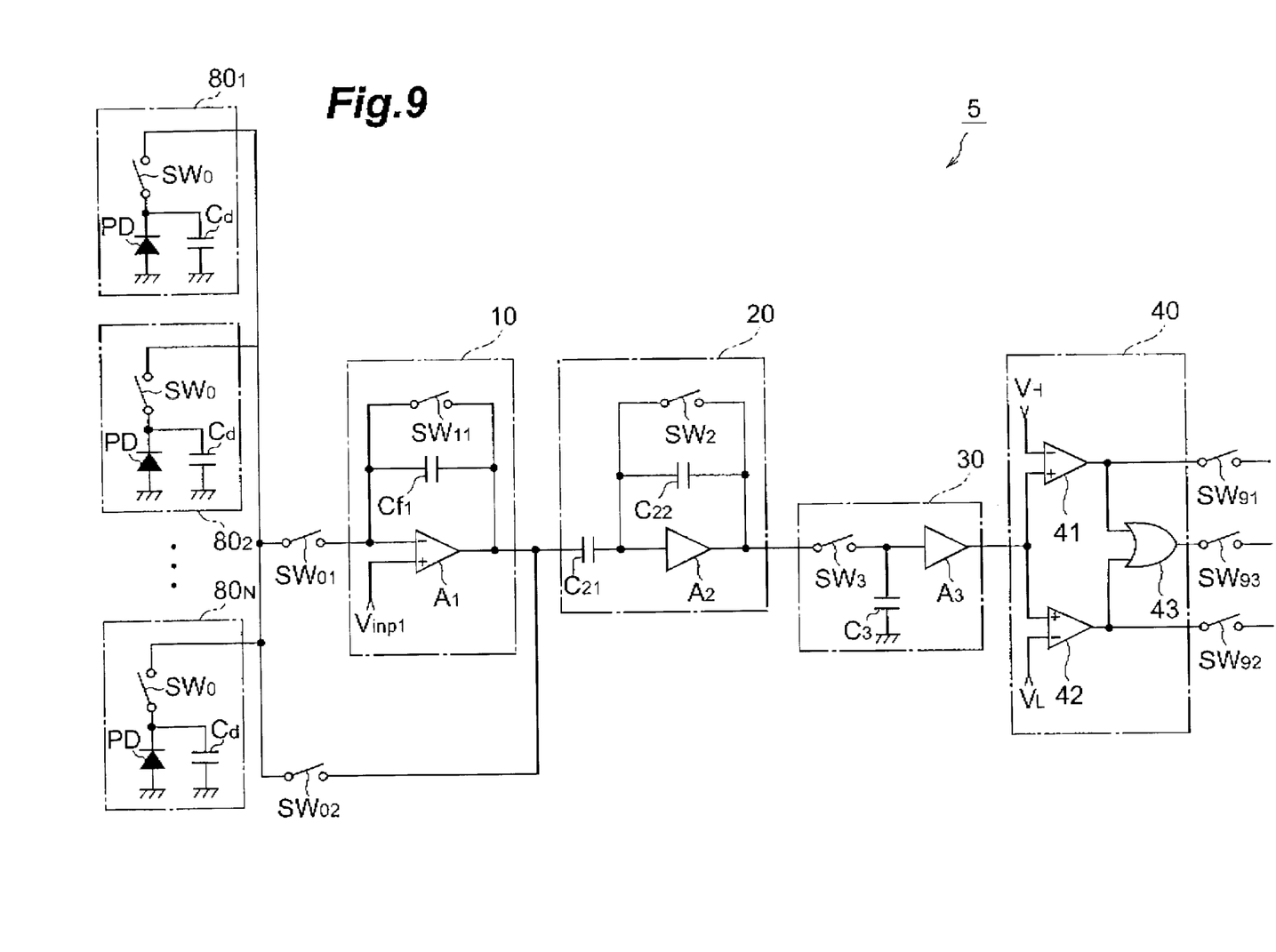
FIG. 9 is a circuit diagram showing an optical detector device 5 according to a fifth embodiment.

FIG. 9 is a circuit diagram of an optical detector device 5 in the fifth embodiment.

The optical detector device 5 of the fifth embodiment is the optical detector device of the first embodiment with the addition of a CDS circuit 20, the sample and hold circuit 30, and the light intensity variance range detector circuit 40.

The optical detector device 5 according to the present embodiment performs the operations of the CDS circuit 20 and the sample and hold circuit 30 as explained in the third embodiment and the operations of the light intensity variance range detector circuit 40 as explained in a fourth embodiment in addition to the operations of the optical detector device 1 according to the first embodiment. In addition, the optical detector 5 according to the present embodiment has the effects of the CDS circuit 20 and the sample and hold circuit 30, as explained in the third embodiment, and the effects of the light intensity variance range detector circuit 40, as explained in the fourth embodiment, in addition to the effects of the optical detector device 1 of the first embodiment.

The present invention is not limited to the forms of embodiment described above, but rather can be modified in a variety of ways. For example, the number N of the optical detector parts 80, or in other words, the number of pixels, may be plural, and the N photodiodes PD may be laid out in a 1-dimensional array, or may be laid out in a two-dimensional array. Conversely, the number of pixels N can also be 1, in which case it is possible to detect increases or decreases in the intensity of light detected by the photodiode PD.

Furthermore, it is not absolutely necessary to provide the CDS circuit 20 in the fourth and fifth examples of embodiment; while in such a case it would not be possible to eliminate the influence of variations in the offset included in the integrator output that is outputted from the integrator circuit 10, it would be possible to reduce the size of the circuit.

Additionally, it is not absolutely necessary in the fifth embodiment to provide the light intensity variance range detector circuit 40. Furthermore, by equipping an A/D converter circuit in the stage after the integrator circuit 10, the CDS circuit 20, or the sample and hold circuit 30, a digital signal can be outputted from the optical detector device. Note that each of the plurality of optical detector parts $80_1$ to $80_N$ is connected sequentially to the integrator circuit 10.

As explained in detail above, with an optical detector device according to the present invention, the charge that is generated according to the intensity of light that is detected by the optical detector element or an optical detector part during a specific time interval is accumulated in a capacitor, and then when a first switch is closed at the point in time that the specific time interval has elapsed, the charge that has accumulated in the capacitor until that point moves to an integrator circuit capacitor in an integrator circuit. The result is that the voltage on one terminal of the optical detector element changes by ΔV to go to the reset level, and the integrator output that is outputted from the integrator circuit goes to a level depending on the charge that is accumulated in the integrator circuit capacitor. When a second switch is closed after the first switch is opened, a voltage that depends on the value of the integrator output that is outputted from the integrator circuit is set into the capacitor. Because the capacitance of the integrator circuit capacitor is the same as the capacitance of the capacitor, the result is that a voltage on one terminal of the optical detector element changes from the reset level by ΔV.

In the next specific time interval, the charge that is generated according to the intensity of light that is detected by the optical detector element accumulates in the capacitor. The charge that has accumulated in the capacitor at the point in time at which this specific time interval elapses is such that the charge that is proportional to the voltage that was set according to the value of the integrator output when the second switch had been closed, and the charge that is generated in the optical detector element during the specific time interval, are superpose on each other. However, the signs of the superposed charges are mutually different. Consequently, when the first switch is closed at a point in time that this specific time interval has elapsed, the integrator output that is outputted from the integrator circuit will depend on the increase or decrease of the intensity of light detected by the optical detector element. In this optical detector device it is possible to detect the increase or decrease of the light intensity for each pixel in an optical image if a plurality of optical detector parts are provided, making it possible to extract moving objects.

In the optical detector device according to the present invention, in this way, the size of the circuit per pixel is substantially smaller than in the conventional technology. In particular, when the junction capacitance of the optical detector element is used as the capacitor, the size of the circuit will be even smaller. Consequently, this optical detector device requires less surface area on a chip for the circuit part for each pixel, so the aperture ratio of each pixel will be high, resulting in superior optical response characteristics.

In addition, when it is made possible to switch the capacitance of the integrator circuit capacitor in the integrator circuit, it becomes possible to detect with high sensitivity increases or decreases in the light intensity for each pixel in an optical image, making it possible to extract moving bodies with high sensitivity. Furthermore, when a CDS circuit is provided as well, it becomes possible to eliminate, using the CDS circuit, the effects of variations in the offset that is included in the integrator output that is outputted from the integrator circuit, making it possible to detect with high accuracy increases or decreases in the light intensity for each pixel in an optical image, making it possible to extract moving objects with high accuracy. In addition, when an optical change range detector circuit is also provided, it becomes possible to obtain increases or decreases in the light intensity for each pixel in an optical image as binary data, making it possible to extract moving objects easily.

What is claimed is:

1. An optical detector device comprising:

(A) at least one optical detector part that has an optical detector element that generates charge according to the intensity of incident light and a capacitor with a specific capacitance and that accumulates the charge that is generated in said optical detector element;

(B) an integrator circuit connected to said capacitor and having an integrator circuit capacitor with said specific capacitance equipped between the input and output terminals of an amplifier;

(C) a first switch equipped between said optical detector part and the input terminal of said integrator circuit; and (D) a second switch equipped between said optical detector part and the output terminal of said integrator circuit.

2. The optical detector device according to claim 1, wherein the number of said integrated circuit capacitors is one.

3. An optical detector device according to claim 1, wherein the number of said integrated circuit capacitors is two or more, said integrator circuit capacitors being connected in parallel, and wherein the combined capacitance of these capacitors is equal to said specific capacitance.

4. The optical detector device according to claim 3, further comprising capacitance switching means that switches the combined capacitance of said integrator circuit capacitors to be less than said specific capacitance.

5. The optical detector device according to claim 1, further comprising an optical change range detection circuit that detects whether or not the output voltage of said integrator circuit is within a specific range.

6. The optical detector device according to claim 1, further comprising a CDS circuit that outputs a CDS output of a value that is dependent on the amount of change in the output voltage of said integrator circuit.

7. The optical detector device according to claim 6, further comprising an optical change range detector circuit that detects whether or not the value of said CDS output is within a specific range.

8. The optical detector device according to claim 1, wherein, for all of a plurality of said at least one optical detector part, a single set consisting of said integrator circuit, said first switch, and said second switch is provided, and said plurality of said at least one optical detector part are connected sequentially to said integrator circuit.

9. The optical detector device according to claim 1, wherein, for all of a plurality of said at least one optical detector part, a single set consisting of said integrator circuit, said first switch, said second switch, and said light intensity variance range detector circuit is provided, and said plurality of said at least one optical detector part are connected sequentially to said integrator circuit.

10. The optical detector device according to claim 6, wherein, for all of a plurality of said at least one optical detector part, a single set consisting of said integrator circuit, said first switch, said second switch, and said CDS circuit is provided, and said plurality of said at least one optical detector part are connected sequentially to said integrator circuit.

11. The optical detector device according to claim 7, wherein, for all of a plurality of said at least one optical detector part, a single set consisting of said integrator circuit, said first switch, said second switch, said light intensity variance range detector circuit, and said CDS is provided, and said plurality of said at least one optical detector part are connected sequentially to said integrator circuit.

12. The optical detector device according to claim 1, wherein a junction capacitance of said optical detector element is used as said capacitor of said optical detector part.

* * * * *